United States Patent [19]
Dooley

[11] 3,940,641

[45] Feb. 24, 1796

[54] PLASMA JET ELECTRODE FOR MAGNETOHYDRODYNAMIC GENERATORS

[75] Inventor: Milton T. Dooley, Florence, Ala.

[73] Assignee: Reynolds Metals Company, Richmond, Va.

[22] Filed: Apr. 5, 1974

[21] Appl. No.: 458,341

[52] U.S. Cl. ............... 310/11; 310/4 R; 219/121 P; 219/123
[51] Int. Cl.[2] .......................................... H02K 45/00
[58] Field of Search ......... 310/4, 10, 11; 219/121 P, 219/123; 315/111.2, 111.4; 313/231.4, 231.5

[56] References Cited
UNITED STATES PATENTS

| | | | |
|---|---|---|---|
| 3,007,072 | 10/1961 | McGinn et al. ................... | 313/231.5 |
| 3,099,131 | 7/1963 | Rosa ................... | 310/11 X |
| 3,102,946 | 9/1963 | Fonberg ................... | 219/123 |
| 3,139,551 | 6/1964 | Lary et al. ................... | 310/11 X |
| 3,267,307 | 8/1966 | Fox ................... | 310/4 |
| 3,278,798 | 10/1966 | Fabre et al. ................... | 315/111.4 |
| 3,322,978 | 5/1967 | Lary et al. ................... | 310/11 X |
| 3,480,805 | 11/1969 | Yerrell ................... | 310/11 |
| 3,575,633 | 4/1971 | Yoon et al. ................... | 219/123 |
| 3,582,976 | 6/1971 | de Simone ................... | 310/11 |
| 3,594,609 | 7/1971 | Vas ................... | 219/121 P X |
| 3,614,489 | 10/1971 | Jensen et al. ................... | 310/11 |
| 3,677,083 | 7/1972 | Van Breugel ................... | 310/11 X |
| 3,736,447 | 5/1973 | Zauderer ................... | 310/4 X |

*Primary Examiner*—Donovan F. Duggan
*Attorney, Agent, or Firm*—Glenn, Palmer, Lyne & Gibbs

[57] ABSTRACT

An anode assembly of an MHD generator has an opening in communication with the generator's main plasma stream. An inert gas is passed between the anode assembly's emitter and a positively biased collector which is in circuit with a load and a cathode emitter on the other side of the main plasma stream.

A supplemental magnetic field rotates an arc about a collector nozzle in an insulated wall, while a magnetic-field shield protects the assembly from the MHD generator's main flux.

The system is operated by ionizing a gas that is passed between the anode's emitter and its positively biased collector to form a plasma jet which is used as an electrode to conduct current across the main plasma stream between the cathode and the collector of the anode assembly.

26 Claims, 6 Drawing Figures

PLASMA JET ELECTRODE FOR MAGNETOHYDRODYNAMIC GENERATORS

BACKGROUND OF THE INVENTION

This invention relates to magnetohydrodynamics (MHD); and more particularly to improved plasma electrodes for MHD generators.

MHD generators produce electrical power by motion of a high temperature electrically conductive gas through a magnetic field. This movement induces an electromotive force between opposed electrodes within the generator.

In order for an MHD generator to produce electrical power it is required that the working gas be a good electrical conductor. Combustion gases are often not at a high enough temperature to give the required electrical conductivity. Therefore, it is customary to "seed" the combustion gas with an easily ionized substance to elevate the gas electron concentration and thus improve the electrical conductivity. Unfortunately, the best seed materials are the alkali metals which are quite reactive as reducing agents. This, coupled with the high temperature combustion gas, has a corrosive effect on hot electrodes. Also, if the electrodes are cooled below the condensation temperature of the seed, electrode shorting results from condensation of the seed on electrode and insulator surfaces. Hence, it is an object of this invention to provide a structure for reducing these problems.

It has previously been suggested that a plasma jet be used to start conduction to a gas shielded electrode. For example, one structure for starting such conduction is described in U.S. Pat. No. 3,480,805 which issued to Yerrel on Nov. 25, 1969. Another such structure is described in French Pat. No. 1,330,199 to Andre Dubois et al. As in the instant case, those prior structures attempted to use a jet of ionized gas to connect to the MHD generator's main plasma stream in order to deliver the generator's output to a load. As indicated in a subsequent paper delivered by Andre Dubois et al at a 1968 MHD colloquium in Warsaw, however, those earlier structures do not appear to have been entirely successful. Hence, it is another object of this invention to provide a fully operative plasma jet electrode for an MHD system.

Prior MHD generators such as those described above have attempted to direct a plasma stream from a first electrode element through an orifice comprising part of a second or "auxiliary" electrode element; and the MHD generator's load was then connected across corresponding elements of associated electrodes located on opposite sides of the MHD duct. These prior art systems, however, do not appear to have been adequate over a sufficiently large range of the generated current flow. Consequently, it is yet another object of this invention to provide a plasma jet electrode assembly that provides satisfactory operation over a wide range of current flows.

It is another object of this invention to provide a structure and method for increasing the efficiency of an MHD generator using plasma jet electrodes and for increasing the life span of such electrodes when used in an MHD system.

SUMMARY OF THE INVENTION

In accordance with principles of the instant invention an anode assembly and a cathode assembly of a given electrode pair are located in opposite walls of an MHD generator's main channel so that the main plasma stream flows therebetween. The MHD system's load is then connected from an emitter of the cathode assembly to a continuously positively biased collector element in the anode assembly having an opening or nozzle therethrough to the main gas stream. In operation, the anode assembly produces a plasma jet which passes through the nozzle or opening in the positive member which acts as a collector electrode for current flowing across the main plasma stream and through the load to the corresponding cathode assembly.

The above described structure allows the plasma jet electrode to have a gap between the anode's collector element and the main MHD plasma stream. Hence, in accordance with other principles of the invention, the anode assembly's electrically positive electrode element is recessed from the wall of the main channel. In this manner, the electrode elements are not exposed to such corrosive effects as either the main stream's ionized gases or its seeding elements.

As the diameter of a plasma jet generator is increased, other things being equal, the speed of the jet tends to decrease. Hence, if large nozzles are used, the jets are less able to penetrate the main stream's boundary layer extending across the electrode locations of the generator's main stream. In accordance with principles of the instant invention, however, a supplemental magnetic field winding is placed about an enlarged nozzle area. This results in an interaction between the supplemental magnetic field and the plasma jet's arc current so as to rotate the arc about the nozzle. In this manner, the plasma is considerably expanded as it passes through the rotating arc so that it fills the enlarged nozzle and provides a more efficient transfer of energy from the main MHD stream to the load.

Finally, in accordance with another principle of the invention, the plasma jet generator's electrodes are surrounded by a magnetic field shield. In this manner, the MHD generator's magnetic field produces less interference with the electrode assembly's torch and the torch quality is improved.

BRIEF DESCRIPTION OF THE DRAWINGS

The foregoing and other objects, features, and advantages of the invention will be apparent from the following more particular description of preferred embodiments as illustrated in the accompanying drawings in which like reference characters refer to the same parts throughout the various views. The drawings are not necessarily to scale, emphasis instead being placed upon illustrating the principles of the invention.

As illustrated in FIG. 1 a prior art MHD generator is comprised of a duct 10 which receives a main stream of high temperature, electrically conductive plasma at an inlet end as indicated by arrow 12. MHD generators frequently have inlet temperatures on the order of 5,000° Fahrenheit or higher, particularly when high concentrations of oxygen are used in the combustion gases received by the generator. Consequently, although an MHD generator has no mechanical moving parts, the thermal stresses are substantial.

Figure 1:
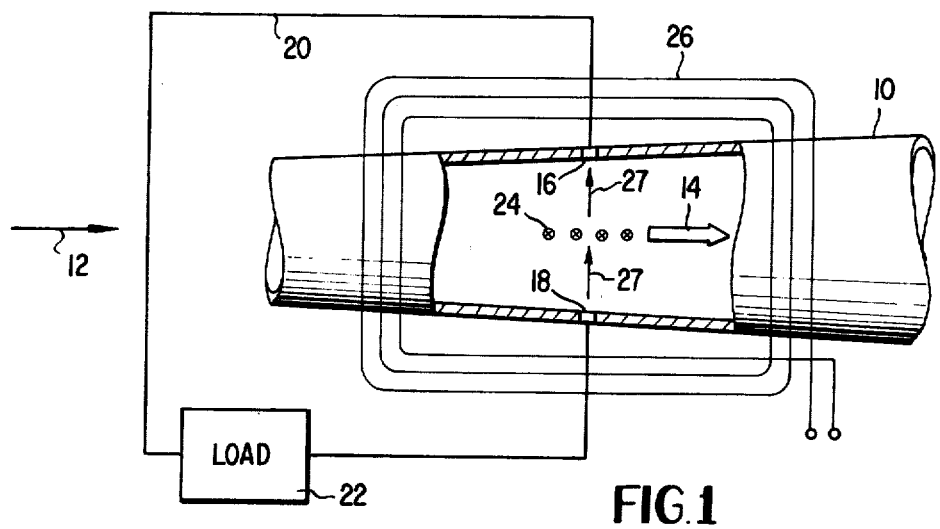
FIG. 1 is a schematic diagram of a conventional MHD generator.

By properly choosing the shape and discharge pressure of the duct 10, the plasma can be made to move through the duct as a substantially constant velocity as illustrated by arrow 14 past one or more electrodes such as 16 and 18 which are placed in circuit 20 with a load 22.

A suitable magnetic flux is placed across the duct in a direction perpendicular to the direction of plasma flow and the plane of the paper as illustrated by conventional symbols 24. This flux may be supplied, for example, by a coil 26 to which electrical current may be supplied from any conventional source or from the generator itself. In this manner, the MHD system generates an EMF between the electrodes 16 and 18 as indicated by arrows 27.

The electrical conductivity of the gas that is delivered to the duct is related to the degree of its thermal ionization which is a function of its temperature. In order to achieve such ionization at lower temperatures, it has been customary to add small amounts (0.1 to 1%) of some easily ionizable material such as potassium or cesium. Similarly, in order for the MHD generator's electrodes to better withstand the high temperature, they are cooled. Hence, there is a tendency for the seeding material to condense on the electrodes and cause shorting.

As noted above, it has been previously suggested that prior art electrodes could have portions thereof disposed outwardly from the walls of the duct 10 and surrounded by an inert gas so that the outwardly disposed electrodes would not be exposed to the generator's main plasma stream. Hence, the outwardly disposed electrode would not be subjected to such high temperatures, seed condensation, or shorting. Those prior art electrodes, however, were not entirely satisfactory and created a need for an electrode assembly of the type which will now be described.

Figure 2:
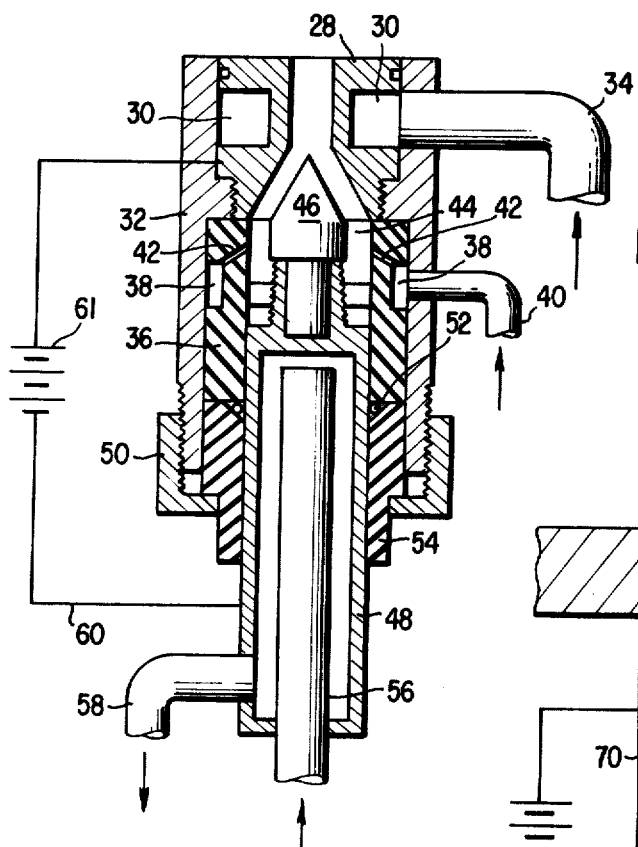
FIG. 2 is a crosssectional view of a typical plasma jet electrode suitable for use in a system of the invention.

The electrode of FIG. 2 incudes a collector 28 which can be made from materials such as copper. The collector is surrounded by a circumferential channel 30 inside a jacket 32 in order to form a passage for a coolant such as water delivered thereto by a conduit 34 and removed by a similar conduit not shown.

A gas injector ring 36 of boron nitride or the like abuts the collector 28 and is provided with a circumferential groove 38 for delivering an inert gas such as argon through an inlet conduit 40 to inlet jets 42. In this respect, the gas from the jets passes into a chamber 44 surrounding an emitter tip 46 of thoriated tungsten or the like. The emitter tip 46 is held in place by a holder 48 which is adjustably located within the anode assembly by suitable means such as retaining ring 50 and compression O ring 52 for adjustment within an insulator block 54 which also abuts the gas injector ring 36 and is held in place within the jacket 32 by the retaining ring 50.

Coolant is circulated in the holder 48 by coolant inlet and outlet conduits 56 and 58; and the emitter is connected to the collector element 28 by a circuit 60 through a biasing source such as D.C. power supply 61 so that the collector is maintained positive with respect to the emitter.

In operation, a suitable gas such as argon, nitrogen, helium, or the like is fed into conduit 40 to chamber 44 where it is blown over the emitter tip 46. The gas then passes out of an opening 62 which functions as a nozzle for the anode assembly 18. As the gas passes between the collector and emitter, the voltage source 61 ionizes the gas to form a plasma jet.

Figure 3:
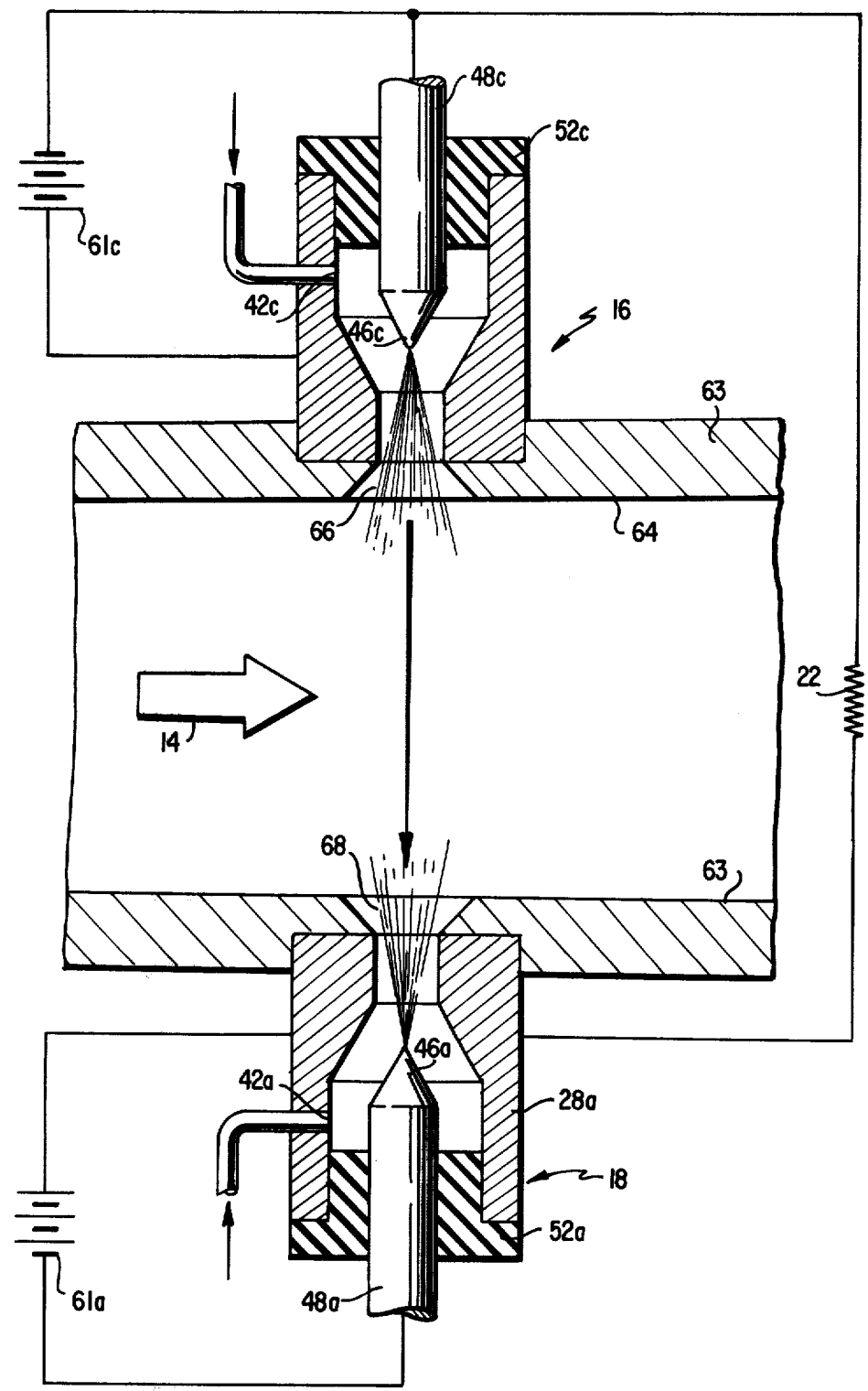
FIG. 3 is a schematic illustration of a FIG. 2 electrode embodied in an MHD system according to the invention.

Two of the above described electrode assemblies are schematically illustrated in FIG. 3 which represents a cathode plasma jet electrode assembly 16 and an anode plasma jet electrode assembly 18 corresponding to those electrodes illustrated in FIG. 1. In this connection, the electrode assemblies are mounted in a well insulated duct wall 10 so that they are considerably recessed from the inner surface 64 of the duct wall; and connected through the load 22 by the emitter element 46c of the cathode assembly and the collector element 28a of the anode assembly.

In operation, as the main plasma 14 flows through the duct 10, it interacts with the magnetic flux 24 so that a potential difference exists across the duct. As the gases from jets 42c and 42a are blown past their respective emitter tips 46c and 46a they are ionized by the voltage sources 61c and 61a to form plasma jets 66 and 68 which function as electrodes and permit a current to be delivered to the load 22. In this regard, it is significant to note that the load is connected between the emitter of the cathode assembly and anode assembly's collector element. In this manner, a strong plasma jet flow can be maintained from the anode assembly's emitter while, at the same time, the MHD output current is permitted to flow between the stable plasma jet electrodes which, by virtue of their stability, permit the electrode assemblies to be recessed well into the insulated walls 63 of the MHD duct 10.

As noted above, when the nozzle of a plasma jet electrode is enlarged it is difficult to maintain adequate plasma velocities without increasing the gas flow through the jets 42. The schematically illustrated structure of FIG. 4, however, permits a desirably large nozzle area without increasing the mass rate of inert gas flow. In this regard, a supplemental magnetic field winding 70 surrounds the jacket 32 and induces a supplemental magnetic field around the electrode assembly. This magnetic field interacts with the arc current between the electrode's emitter element 46 and its collector element 28 to cause the arc to rotate as shown by arrow 72. Consequently, as the gas passes through the rotating arc it is heated so that the plasma is considerably expanded and continues to exit from the nozzle at a high velocity.

Figure 4:
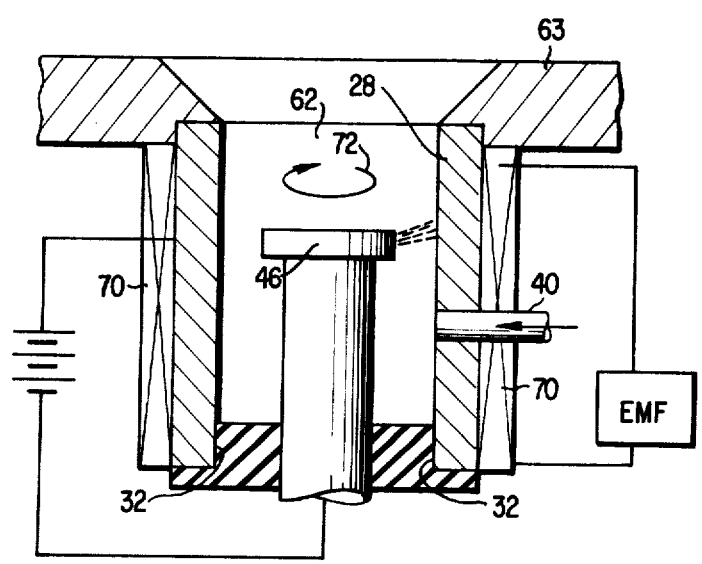
FIG. 4 is a sectional schematic illustration of an alternate embodiment of the electrode illustrated in FIG. 2.

The structure of FIG. 4 is not only simple and efficient, but quite versatile. That is, its principles can be employed on either the anode electrode assembly or the cathode electrode assembly or both. Note also that the mere rotation of the arc does not limit the nozzle area to a circular configuration. The arc also rotates satisfactorily, for example, when the nozzle 62 is elliptical or even nearly rectangular.

Figure 5:
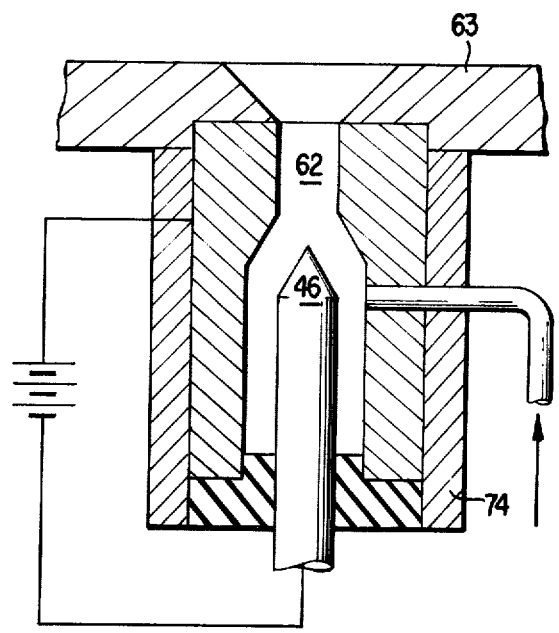
FIG. 5 is still another alternate embodiment of an electrode suitable for use in the system of the invention.

In accordance with still another embodiment of the invention a FIG. 2-type electrode assembly is surrounded by soft iron 74 (FIG. 5) or another suitable type of magnetic material to act as a magnetic-field shield. This structure protects the plasma jet assembly from interference by the magnetic flux 24 from the MHD coil 26; and improves the quality of the plasma jet generated by the electrodes. Similarly, although not illustrated, the shield 74 can be applied to the exterior of the supplemental field winding 70 in FIG. 4 to produce a magnetic-field shielded plasma jet electrode which, nevertheless, has a rotating arc for producing plasma expansion and permitting a wide diameter electrode nozzle.

Figure 6:
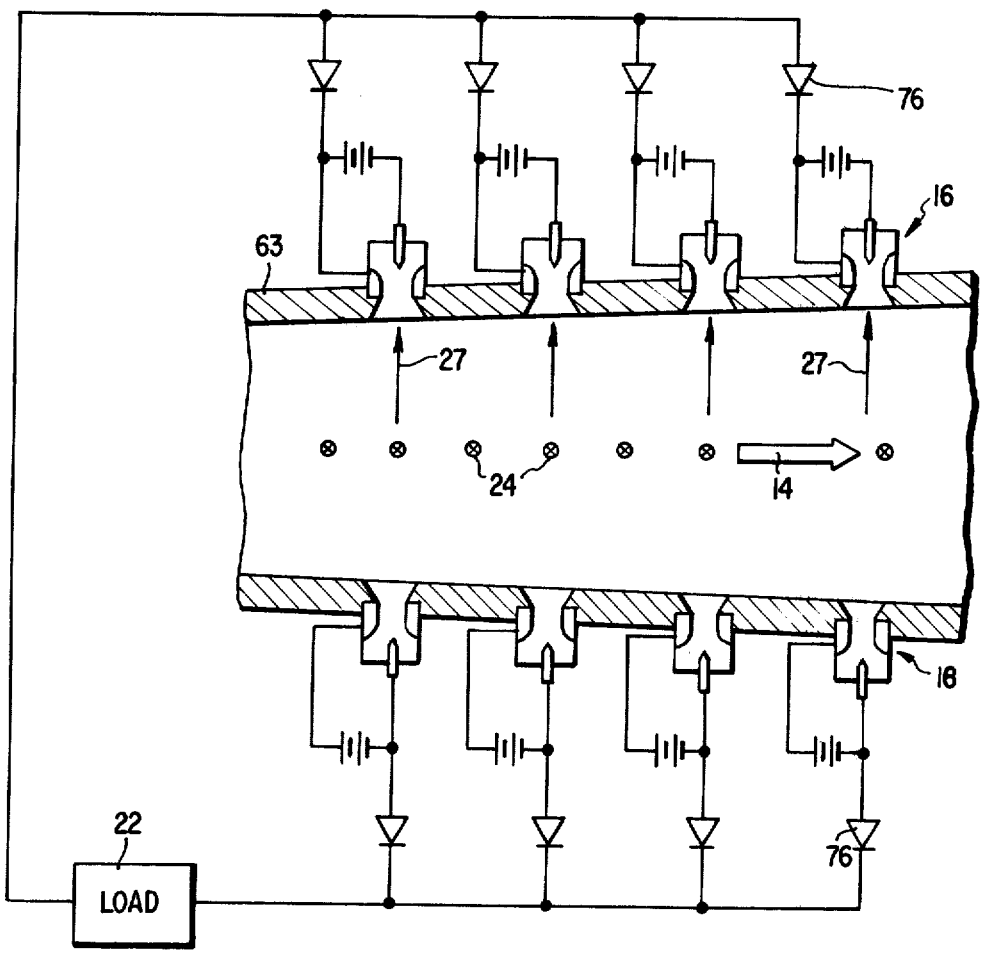
FIG. 6 is a schematic illustration of a plurality of plasma jet electrodes in circuit with an MHD load.

The various types of above described plasma jet electrodes are easily assembled in large quantities along a duct such as that illustrated in FIG. 1. In FIG. 6, for example, a series of plasma jet cathode assemblies 16 are located along one of the MHD duct's walls 63 and a series of anodic plasma jet electrodes are mounted opposite the cathode assemblies on the opposite wall of the MHD duct 10. Again, the main plasma flow 14 is from left to right; and the magnetic field is into the paper as indicated by the symbols 24. Each of the plasma jet electrodes is electrically connected in the manner described in connection with FIG. 3 except that a series of diodes 76 isolate the individual electrodes so that they appear to the MHD duct as though they are segmented.

The above described structure can be conveniently constructed into a 20 megawatt MHD system. In this connection, 200 plasma jet electrode assemblies are located on either side of an MHD duct that is 4 meters long, 0.7 meters high and 0.36 meters across so that the duct has a volume of approximately one cubic meter. A main plasma stream is then directed through the duct at about mach 0.9 (845 meters per second) in a magnetic field having a strength of 4 Tesla. The plasma has a temperature and content such that its gas conductivity is 30 Mhos per meter to result in an open circuit voltage across the load of about 1,200 volts; or, a power density of about 20 megawatts per cubic meter with each of the electrodes carrying a current of 85 amperes. Significantly, because of the stability of the plasma jets and the improved efficiency of the above described electrodes, each can carry currents of as much as 400 amperes so that increases in the gas conductivity, gas velocity, or magnetic field strength can result in a 100 megawatt generator without any increase in duct volume.

When emitters in structure of the invention were operated at 300 amperes with nozzle current densities of 400 amps per square centimeter, the emitter loss rate was only 0.00062 grams per hour per square centimeter. A conventional electrode, on the other hand, experiences loss rates of about 0.2 grams per hour per square centimeter for current densities of only one amp per square centimeter. Moreover, because the above described plasma jet emitter elements are fabricated from thoriated tungsten, they are sufficiently inexpensive that their minimal loss rate is insignificant.

While the invention has been particularly shown and described with reference to preferred embodiments thereof, it will be understood by those skilled in the art that various alterations in form and detail may be made therein without departing from the spirit and scope of the invention. For example, while the plasma jet electrode's cathode element has been described as being made of thoriated tungsten, other materials can also be used. Similarly, the dimensions of the MHD generator system described in connection with FIG. 6 can be altered in various manners without affecting the gist of the invention; and the electrode pairs can be connected in series if that is desired.

The embodiments of the invention in which an exclusive property or privilege is claimed are defined as follows:

1. An MHD system having an anode assembly, a cathode assembly, duct means for passing a plasma stream therebetween, means for passing a magnetic flux across said duct means, and circuit means connecting said anode and cathode assembly, said system further comprising:
   a collector of said anode assembly connected to said circuit means and having an opening therethrough for communication with said duct means;
   an emitter of said anode assembly located adjacent said collector;
   means to pass an ionizable gas between said collector and emitter; and
   means for maintaining said collector positive relative to said emitter.

2. The system of claim 1 wherein said duct includes an insulated wall and wherein said collector of said anode assembly is recessed outwardly from the inner surface of said insulated duct wall and thereby separated from said plasma stream.

3. The system of claim 1 including supplemental means for imposing a supplemental magnetic flux about at least one of said anode and cathode assemblies.

4. The system of claim 3 wherein the cross-sectional area of said opening is large relative to the mass rate of gas flowing therethrough.

5. The system of claim 1 including a magnetic field shield for shielding at least one of said anode and cathode assemblies from said magnetic flux across said duct means.

6. The system of claim 5 including supplemental means located between said magnetic field shield and the thusly shielded assembly for imposing a supplemental magnetic flux on the shielded assembly.

7. The system of claim 6 wherein the cross-sectional area of said opening is large relative to the mass rate of gas flowing therethrough.

8. The system of claim 1 including a plurality of such anode assemblies located along said duct means, each of said first members thereof being in said circuit connecting said anode and cathode assemblies and including:
   means for electrically isolating said first members from each other.

9. An MHD system having an anode assembly, a cathode assembly, duct means for passing a plasma stream therebetween, means for passing a magnetic flux across said duct means, and circuit means connecting said anode and cathode assemblies, said system further comprising:
   a collector of said anode assembly connected to said circuit means and having an opening therethrough for communication with said duct means;
   an emitter of said anode assembly adjacent said anode collector;
   means for positively biasing said anode collector relative to said anode emitter;
   a collector of said cathode assembly having an opening therethrough for communication with said duct means;
   an emitter of said cathode assembly adjacent said cathode collector and connected to said anode collector through said circuit means; and means for passing an ionizable gas between each collector and the corresponding emitter.

10. The system of claim 9 wherein said duct includes an insulated wall and wherein said collector of said anode assembly is recessed outwardly from the inner surface of said insulated duct wall and thereby separated from said plasma stream.

11. The system of claim 9 including supplemental means for imposing a supplemental magnetic flux about at least one of said anode and cathode assemblies.

12. The system of claim 11 wherein the cross-sectional area of the opening in at least one said collectors is large relative to the mass rate of gas flowing therethrough.

13. The system of claim 9 including a magnetic field shield for shielding at least one of said anode and cathode assemblies from said magnetic flux across said duct means.

14. The system of claim 13 including supplemental means located between said magnetic field shield and the thusly shielded assembly for imposing a supplemental magnetic flux on the shielded assembly.

15. The system of claim 14 wherein the cross-sectional area of the opening in at least one of said collectors is large relative to the mass rate of gas flowing therethrough.

16. The system of claim 9 including a plurality of such anode assemblies located along said duct means, each of said collectors of said anode assemblies being in said circuit connecting said anode and cathode assemblies and including:
means for electrically isolating said collectors of said anode assemblies from each other.

17. A method of operating an MHD system of the type including a cathode assembly and an anode assembly having an emitter member and a collector member, duct means for passing a main plasma stream between said anode assembly and said cathode assembly, means for passing a main magnetic flux across said duct means, and circuit means connecting said anode and cathode assemblies, said method comprising the steps of:
maintaining the collector of said anode assembly positive relative to the emitter of said anode assembly;
passing a gas between the emitter and collector of said anode assembly and ionizing said gas to form a plasma jet; and
using said plasma jet as an electrode to conduct current across said main plasma stream between said cathode to said collector of said anode assembly.

18. The method of claim 17 for use in an MHD system wherein said collector of said anode assembly includes an opening therethrough for communication with said main plasma stream and including the steps of:
striking an arc between said emitter and collector of said anode assembly; and
rotating said arc about said opening.

19. The method of claim 17 including the step of shielding at least one of said anode and cathode assemblies from the effects of said magnetic flux.

20. The method of claim 19 for use in an MHD system wherein said collector of said anode assembly includes an opening therethrough for communication with said main plasma stream and including the steps of:
striking an arc between said emitter and collector of said anode assembly; and
rotating said arc about said opening.

21. The method of claim 17 wherein said MHD system includes a plurality of such anode assemblies located along said duct means, each of said collectors of said anode assemblies being in circuit with said means connecting said cathode assembly and including the steps of:
electrically isolating the collectors of said anode assemblies from each other.

22. A method of operating an MHD system of the type including a cathode assembly and an anode assembly each having an emitter and a collector, duct means for passing a plasma stream between said cathode assembly and said anode assembly, means for passing a main magnetic flux across said duct means and circuit means for connecting said anode and cathode assemblies, said method comprising the steps of:
positively biasing the collector member of said anode assembly relative to the emitter member of said anode assembly;
passing a gas between the emitters and collectors of said anode and cathode assemblies and ionizing said gas to form a cathode plasma jet electrode and an anode plasma jet electrode; and
using said plasma jet electrodes to conduct current across said main plasma stream between the cathode and said collector of said anode assembly while at the same time maintaining said circuit means between the emitter of said cathode assembly and the collector of said anode assembly.

23. The method of claim 22 for use in an MHD system wherein said collectors include an opening therethrough for communication with said main plasma stream and including the steps of:
striking an arc between said emitter and collector of said anode assembly; and
rotating said arc about the opening in said anode assembly.

24. The method of claim 22 including the step of shielding at least one of said anode and cathode assemblies from the effects of said magnetic flux.

25. The method of claim 24 for use in an MHD system wherein said collectors include an opening therethrough for communication with said main plasma stream and including the steps of:
striking an arc between said emitter and collector of said anode assembly; and
rotating said arc about the opening in said anode assembly.

26. The method of claim 22 wherein said MHD system includes a plurality of such anode assemblies located along said duct means, each of said collectors of said anode assemblies being in circuit with said means connecting said cathode assembly and including the steps of:
electrically isolating the collectors of said anode assemblies from each other.

* * * * *